United States Patent Office 3,547,734
Patented Dec. 15, 1970

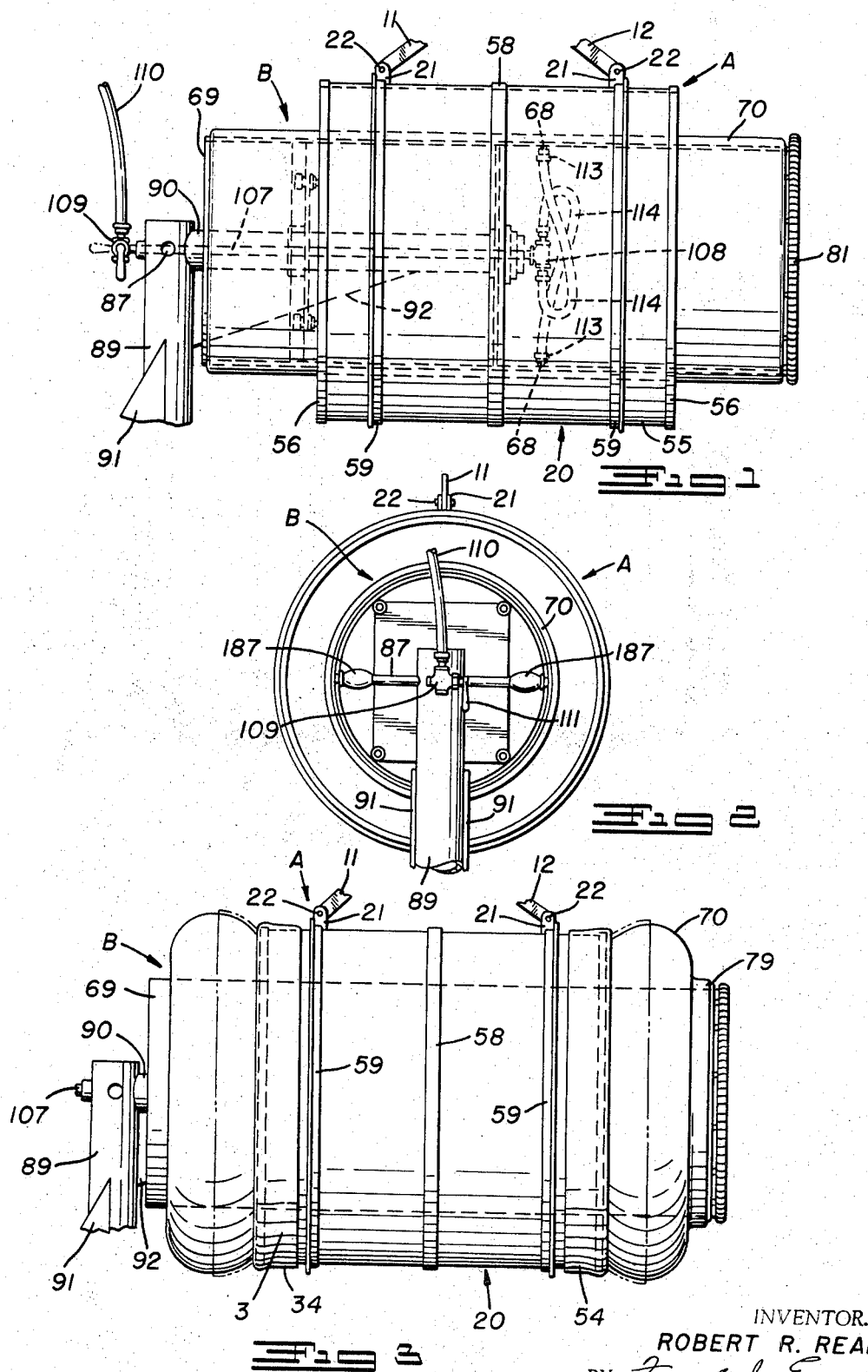

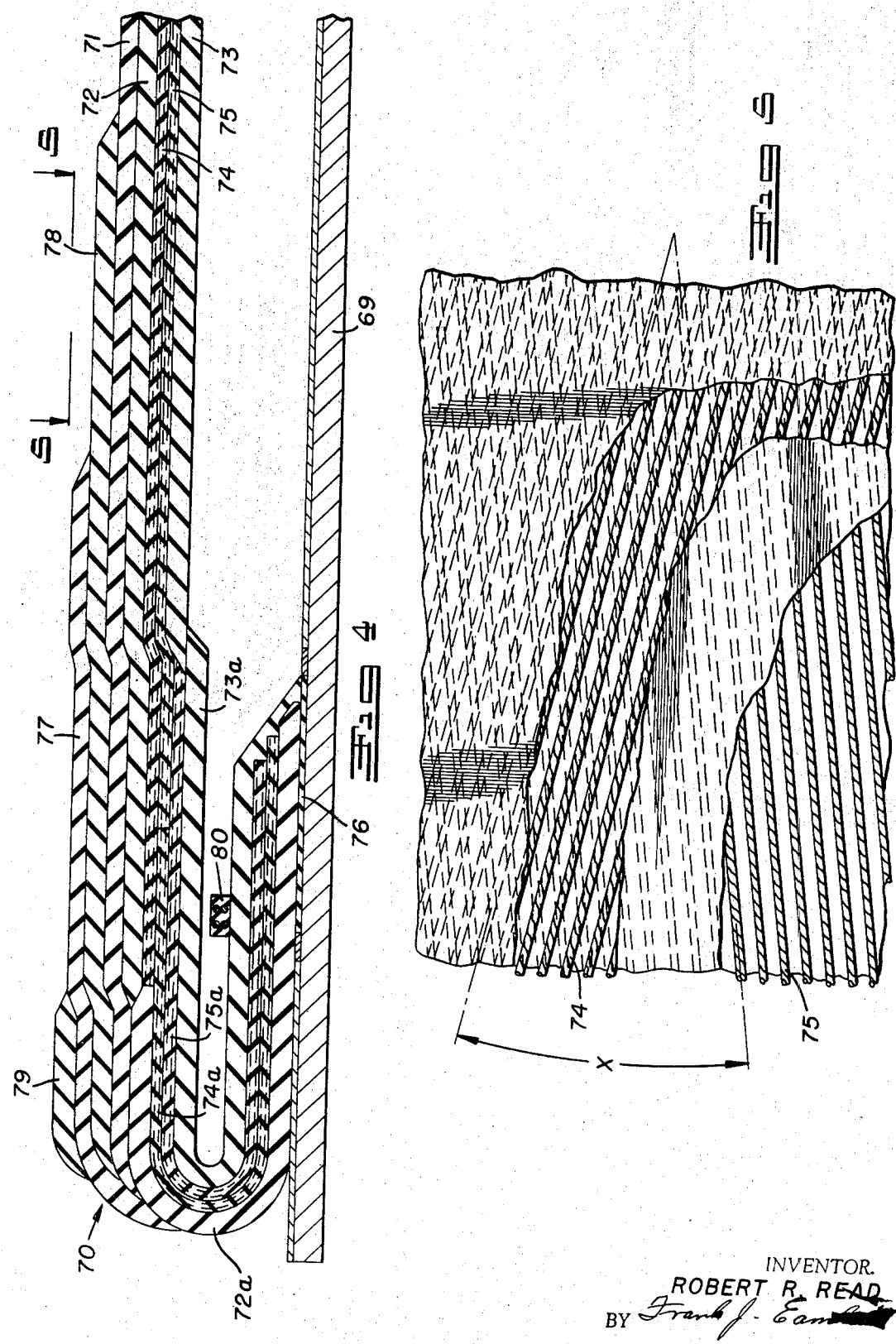

3,547,734
TIRE BAND APPLYING DRUMS
Robert R. Read, Cuyahoga Falls, Ohio, assignor to The General Tire & Rubber Company, a corporation of Ohio
Filed July 12, 1967, Ser. No. 652,927
Int. Cl. B29h *17/16*
U.S. Cl. 156—416             11 Claims

ABSTRACT OF THE DISCLOSURE

An expansible bag or sleeve used on a tire band applying drum features improved expansion characteristics and means for attaching it to the drum. The bag or sleeve is constructed to be less resistant to expansion at its central portion than at its ends. This is effected by providing that the portions of the bag at the ends of the drum are of greater radial cross-section than the portion therebetween. Also, the bag is held on the drum by a rubber to metal adhesive at the axial ends rather than by conventional inextensible beads as heretofore.

BACKGROUND OF THE INVENTION

Some large tires cannot be built efficiently by successive manual placement of endless bands of tire material upon a tire building drum and then expanded to final shape, as are the smaller passenger-size tires. The endless bands of tire material that go into the building of a large tire are usually too large for manual application to the tire building drum. Many different types of equipment have been designed through the years to handle these giant, endless bands of tire material and to facilitate their application to a tire building drum. Some of this equipment has been of a highly sophisticated nature and therefore expensive. Other equipment, while relatively simple, has been inefficient.

These larger tires have been satisfactorily built by using equipment disclosed and claimed in U.S. Pats. Nos. 2,871,912 and 3,018,213 both of which are assigned to the assignee of the present invention. These patents disclose tire building equipment which generally includes a tire building drum, a transfer cylinder and an expansible band holding drum. Endless bands of tire material are expanded by inflation of the band holding drum against the transfer cylinder. The band holding drum is deflated, and the tire band is held to the cylinder because of a partial vacuum created between the transfer cylinder and the tire band. The transfer cylinder with the band is then brought over to the tire building drum and the tire band is released from the cylinder and snaps into engagement with the tire building drum.

The expansible band holding drum is normally a cylindrical metal drum provided with a tube or bag, attached to its outer surface, which is inflatable radially of the drum.

Recently, certain difficulties have arisen using the above-described equipment. It has been found that the band of tire material is sometimes off center when in contact with the transfer cylinder. The inner surface of the band is sometimes wrinkled or irregular when attached to the transfer cylinder. The partial vacuum which is to exist between the outer surface of the band and the inner surface of the cylinder has been found to vary in certain portions of the area of band-cylinder contact, which causes the band to sag from the cylinder at certain points.

These problems exist primarily because of the construction of the inflatable bag or tube used with the expansible band holding drum. The bag, constructed according to the disclosures of the above-mentioned patents is found to shift longitudinally and circumferentially in relation to the metal drum while in use. This is primarily due to the fact that the bags or tubes are held against the drum by axially spaced annular bead rings. Also, because these bags radially expand into a generally cylindrical shape from the drum, the application of the tire band to the transfer ring is often irregular or uneven. The tire band is to be held to the transfer ring because of a partial vacuum which exists between the band and the inner surface of the cylinder. When the band is unevenly applied to the cylinder, this partial vacuum is not uniform and the band will sag at certain locations across the width of the cylinder.

SUMMARY OF THE INVENTION

It is an object of the present application to provide an expansible bag which is to be used on a band applier drum which will overcome the above problems.

Another object of this invention is to provide a bag of such construction as to insure a proper application of a tire band to a transfer cylinder.

It is a further object of the present invention to improve the stability of the bag in relation to the drum by improved mounting means.

It has been found that an efficient partial vacuum between a band and transfer cylinder can be created when the center of the band contacts the cylinder surface before its end portions, and the band is smoothed or rolled into contact with the cylinder surface outwardly from the center. This action will result by using the improved inflatable bag of this invention. This smoothing or rolling action is created simply by providing that the center portion of the bag be less resistant to expansion than the end portions. To produce such a structure, additional layers of rubber are added to the end portions of the bag.

Also, it has been found that if the annular bead ring attaching means of the tube or bag is replaced by a rubber to metal bond between the surface of the bag and the surface of the drum with the drum surface acting as the longitudinal strength member there will be no torsional distortion of the bag in relation to the drum.

BRIEF DESCRIPTION OF THE DRAWINGS

FIG. 1 is an elevational view of a transfer cylinder and band holding drum containing the expansible bag of the present invention, with parts omitted and parts broken away.

FIG. 2 is an end view of the apparatus of FIG. 1 with parts omitted and parts broken away.

FIG. 3 is a fragmentary side elevational view with parts broken away and shown in sections, showing the band-holding drum within the transfer cylinder with its expansible bag expanded and the end portion of the band cuffed over the ends of the transfer cylinder.

FIG. 4 is an enlarged fragmentary longitudinal vertical sectional view with parts omitted showing the construction of the expansible bag according to the present invention.

FIG. 5 is an enlarged fragmentary view of the bag taken on the line 5—5 of FIG. 4 showing the arrangement of the reinforcing cords.

DETAILED DESCRIPTION OF THE INVENTION

Referring more particularly to the drawings, in which like parts are identified by the same numerals throughout the several views, FIGS. 1 through 5 show a band applying apparatus which is described in more detail in U.S. Pats. Nos. 2,871,912 and 3,018,213. The apparatus includes a transfer cylinder A and an expansible band holding drum B for expanding the preformed elastic bands of tire material against the transfer cylinder. Cylinder A and the drum B are employed to assist in the mounting of tire bands on a tire building drum. The transfer cylinder A is of an internal diameter greater than that of the tire building drum and greater than that of a preformed elastic band 3 that is to be transferred to the drum, so that the band may be readily positioned within the cylinder and expanded against the cylinder, and so that the cylinder may readily be moved to a position wherein the tire building drum is within cylinder A and the band 3 carried thereby. The elasticity of the band causes it to snap inwardly out of engagement with the cylinder and into engagement with the drum or the material on the drum. The cylinder A has an open end to receive the tire building drum and an open end to receive the expandable band holding drum B, both ends preferably being open so that the cylinder may be moved from the band holding drum to the tire building drum.

The transfer cylinder A is preferably mounted on a suitable carriage or support for movement between a position surrounding the band holding drum B and a position surrounding the tire building drum. One suitable support is disclosed in detail in the aforementioned U.S. Pat. No. 2,871,912.

The outer shell 20 of the cylinder A has a pair of aligned yokes or lugs 21 welded thereto at the top of the cylinder to permit attachment of supporting bars 11 and 12, each yoke being spaced from an end of the cylinder and having aligned circular openings therein for receiving a pivot pin 22. This particular construction finds use in the carriage means described in U.S. Pat. No. 2,871,912 and is not important to the present invention.

The transfer cylinder A has an internal circumference greater than the normal circumference of the preformed elastic band to be applied to the tire building drum so that the band must be stretched and expanded against the internal surface of the transfer cylinder.

The preformed elastic band 3 is held against the internal surface cylinder by a pressure differential between its radial inner and outer surfaces sufficient to hold the band in expanded position against the inner surface of the transfer cylinder. This pressure differential is created by forcing the air from between the outer surface of the band and the inner surface of the cylinder A so that the partial vacuum exists therebetween. This pressure differential can be easily created upon expansion of the band holding drum because of the improved construction of its expandable bag, as will be more fully explained, hereinafter.

As herein shown, particularly in FIG. 3, the transfer cylinder A is constructed so that the opposite end portions of the elastic band 3 may be turned radially outwardly and axially inwardly over the ends of the cylinder to form cuffs 54 having an axial width of several inches, the center of each lug 21 being spaced sufficiently from the nearest end of the cylinder A to permit forming a cuff at each end of the cylinder. When the end portions of the band 3 are turned over the end portions of the transfer cylinder A, the entry of air between the band and the cylinder may be prevented and the necessary partial vacuum may be maintained.

The metal shell 20 of the cylinder A is in the form of a right circular cylinder and has a smooth outer surface 55. The opposite ends of the shell are reinforced by annular outer metal rings 56. A central ring 58 and a pair of angles 59 of L-shaped cross-section are also provided to reinforce the same. These reinforcing members are suitably welded to the metal shell 20.

Most types of expansible band holding drums employ only one bag which has an axial length greater than that of the transfer cylinder. The expansible drum B shown herein is of this type. This drum comprises a rotatable metal cylinder 69 of uniform radial thickness having an axial length more than five times its radius and annular inflatable bag 70 mounted on said cylinder and extending the full length of the cylinder. Bag 70 is in the form of a rubber sleeve concentric with the drum surface 69 with the axial ends thereof turned or doubled under to contact axially spaced annuli of the drum outer surface 69. The ends are bonded to the drum surface to form an annular air chamber between the sleeve and the drum surface, extending substantially the entire length of the drum. The bag 70 is constructed to expand in substantially toroidal form, that is, the center portion of the bag initially expands to a larger degree than do the end portions. This improves the application of the band 3 to the transfer cylinder A, since the band contacts the center of the cylinder undersurface before the edges and is smoothed to the inner surface with a "rolling" or "wiping" action from the center outwardly. This action effectively removes more air between the band and the transfer cylinder inner surface than has been previously possible, and therefore improves the partial vacuum therebetween.

FIG. 4 shows the construction of bag 70 as basically comprising three annular layers of rubber 71, 72, and 73 which extend substantially the entire length of the drum. These layers are shown reinforced by layers of rubberized cords 74 and 75, these cord layers are preferably included in the construction of the bag 70, but are not always necessary.

The radial inner layer 73 overlaps, and is spliced to, a U-shaped rubber layer 73a at each axial end of the drum 69. The layers 71 and 72 are similar connected to layer 72a. Between layers 73a and 72a are rubberized cord layers 74a and 75a connected respectfully to the axially extended cord layers 74 and 75. The combined layers 72a, 73a, 74a, and 75a at each end of the drum are held to the drum surface along an annulus, spaced axially from each end of the drum toward the center, by a rubber to metal bond 76.

The toroidal expansion of the bag 70 is caused and controlled by adding annular layers of rubber stock to the axial ends of the bag. At each end of bag 70 are additional annular rubber layers 77 and 78. Although only two such layers are shown, any number of additional rubber layers may be added. These layers do not extend the length of the drum. The length of these layers varies depending upon their radial distances of the surface of the drum. The added layer which is at the greatest radial distance from the drum surface is the shortest in length. In other words, the lengths are stepped off axially, as each additional layer is applied. These layers can extend from each end a distance 10% to 30% of the length of the drum. These additional layers make the end portions of the bag 70 more resistant to expansion than the center, and thus the bag, with the band 3 in position, will contact the center of the transfer cylinder before the edges, as described hereinbefore.

The cord layers 74 and 75 including their extension layers 74a and 75a at each end of the bag 70 are preferably included in construction of the bag for several reasons. In addition to providing additional strength to the bag, the cord layers prevent, or help prevent, gravitational sag of the bag. Also, the cord reinforcement resists torsional distortion and improves longitudinal stability. The above improvements are primarily due to the angle X at which the cords of the layers cross each other. In the aforementioned U.S. Pats. Nos. 2,871,912 and 3,018,213, the angle at which the cords cross each other is limited to a slight angle between 0° and 5°. Increasing this angle to a large value, even up to 45°, improves the bag 70 as mentioned above. This larger angle causes cord layers to form a lattice-work pattern with each other during expansion of the drum and thereby creating a truss effect in the bag which strongly resists all but true radial movement. Designing the cord in this manner also allows for a substantial decrease in the number of cords heretofore required from about 35 cords per inch to around 15 cords per inch.

An annular, relatively inextensible, pre-cured belt 79 is preferably placed around the band-applying end of the bag 70 to hold this portion flat to the drum surface 69. This belt 79 is shown in FIGS. 3 and 4. This belt insures that any shortening of the bag, due to cord shrinkage or permanent set of the rubber layers, will be transferred to the nonband-applying end of the drum. Because of this belt, the front (band-applying) end remains flat while the back end rolls up and off the drum surface 69, as shown in FIG. 3. This facilitates band application.

The bag 70 is held to the drum surface 69 by a rubber to metal bond 76. The location of the bond is adjacent each axial end of the drum, spaced a sufficient distance to allow the end portions of the bag to move away from the outermost ends of the drum. In U.S. Pats. Nos. 2,871,912 and 3,018,213, the bag is held to the drum primarily by means of two annular bead rings spaced axially inwardly from the ends of the drum. This means of attachment has proven undesirable because the bag shifts in all directions with relation to the drum surface. With the rubber to metal bond as herein disclosed longitudinal and torsional stability is assured since the surface 69 of the drum constitutes the strength member of the attachment means. Also because of this novel means of attachment, a savings of material may be realized. In the prior art, bags of this type required inner and outer sections extending the entire length of the drum. Between the annular bead rings, lying on the surface of the drum, was a static area of reinforced layer or layers of rubber stock. A rubber to metal bond negates the need for material in this static area. Any suitable cement may be used for holding the rubber to the metal.

In addition to the rubber to metal bond discussed above, bead rings 80 may be provided as a safety measure in case of failure of the bond. These rings 80 are placed within the air chamber above the bond 76 as shown in FIG. 4.

The bag 70 is radially expanded from the drum surface 69 by forcing air through openings, such as 68, in the drum surface. Air is supplied from a suitable source, through an inlet 110, through a valve 109, horizontal pipe 107, T-fitting 108, flexible rubber hoses 114, through pipes 113 connected with openings 68. More detailed descriptions of this air supply means are disclosed in U.S. Pats. Nos. 2,871,912 and 3,018,213.

The band applying drum B is mounted in cantilever fashion on a horizontal cantilever arm 90 welded to a vertical tubular steel standard 89, which is supported by vertical gusset plates 91 on a movable platform, not shown. The cantilever arm 90 is supported by a gusset plate 92 welded thereto and to standard 89. Handles 87 with rubber grips 187 are mounted on cylinder 89 to provide manual movements of the drum by means of the movable platform, not shown. Suitable drum supports and bearings for the arm 90 are located within the drum and are fully described in detail in U.S. Pats. Nos. 2,871,-912 and 3,018,213.

To facilitate mounting of tire bands on to the drum B, an annular ring 81 of wooden rollers, more particularly described in U.S. Pats. Nos. 2,871,912 and 3,018,213, is located at the band-applying end of the drum. In addition, an annular blow-ring (not shown) between the ring 81 or rollers and the end of the bag 70 may be provided to facilitate application of the tire band to the drum. Such a blow-ring may take the form of a pipe or tube bent into a toroidal shape having a multitude of small perforations on the side toward the bag 70, and to which is connected a supply of compressed air.

To operate the apparatus described in relation to FIGS. 1 through 5, a preformed endless tire band 3 is pulled over the ring of rollers 81 to a central position on the drum B. Air is then admitted through the drum opening 68 into the chamber between the bag 70 and the drum surface 69. The bag 70 expands radially outwardly, the center portion expanding to a greater degree than the end portions. The center of the tire band 3 contacts the center of the internal surface of the transfer cylinder A, which has been previously placed in position around the drum B.

After this contact, further expansion of the bag smoothes or "wipes" the band to the surface of the ring from the center axially outwardly. This "wiping" action forces air from between the outer surface of the band 3 and the inner surface of the transfer cylinder A causing a partial vacuum therebetween. As the bag 70 expands further, this vacuum is sealed by a "cuffing" of the bands over the ends of the ring A. The cuffed ends of the band on the transfer cylinder are shown as 54 in FIG. 3. The bag is then deflated by proper manipulation of valve 109 and the transfer cylinder with applied band 3 is moved into position over a tire building drum and the operation completed, as more fully described in U.S. Pat. No. 2,871,-912.

Various modifications and variations may be made to the preceding structures without departing from the scope of this invention.

What is claimed is:

1. A cylindrical drum for applying tire bands to a transfer cylinder used in tire building installations comprising a metal drum having a generally cylindrical outer surface, an annular, radially expansible, elastomeric sleeve attached to the outer cylindrical surface of said metal drum to coextend therewith, said sleeve being of varied radial cross-section along the length thereof which is radially beyond and extends axially along the outer cylindrical surface of said drum, such that selected portions of said sleeve extending axially of said drum and adjacent the ends thereof are of greater radial cross-section than the portion of said sleeve therebetween.

2. The apparatus as set forth in claim 1 further characterized in that said sleeve comprises a plurality of annular superposed layers of rubber, at least one of which extends the entire length of the metal drum.

3. The apparatus as set forth in claim 1 wherein said sleeve is reinforced by rubberized cords along the length of the drum.

4. The apparatus as set forth in claim 1 wherein said sleeve is attached to said drum by two annular layers of rubber-to-metal bonding cement positioned beneath said portions of said sleeve adjacent the ends of the drum, but spaced from the ends of the drum.

5. The apparatus as set forth in claim 2 further characterized in that said portions of said sleeve adjacent the ends of said drum each contain a greater number of said superposed rubber layers than said portion therebetween.

6. The apparatus as set forth in claim 2 wherein said sleeve further includes at least one annular layer of rubberized cords extending the length of the drum.

7. The apparatus as set forth in claim 2 wherein said sleeve further includes two superposed adjacent layers of rubberized, parallel-spaced cords in which the direction of cord orientation in one layer makes an angle between 5° and 45° with the direction of cord orientation in the adjacent layer.

8. An expensible drum for applying tire bands to a transfer cylinder used in tire building installations, comprising a generally cylindrical metal drum, a cylindrical, expansible, rubber sleeve coextensive with the outer surface of said drum, the ends of said sleeve being tucked or folded beneath the outer surface of said sleeve to contact the outer surface of said drum, each end of said sleeve being annularly fixed to the outer surface of said drum beneath the outer surface of said sleeve by a rubber-to-metal bond.

9. The apparatus as set forth in claim 8 including two annular bead rings positioned between the outer surface of the sleeve and each folded end directly above the rubber-to-metal bond.

10. The apparatus as set forth in claim 8 wherein each rubber-to-metal bond is spaced from the axial ends of the drum.

11. The apparatus as set forth in claim 10 wherein a narrow, relatively inextensible, pre-cured annular belt is tightly fitted over the sleeve at one end of the drum.

References Cited
UNITED STATES PATENTS

| | | | |
|---|---|---|---|
| 3,018,213 | 1/1962 | Kraft | 156—416 |
| 3,070,478 | 12/1962 | Riddle | 156—416X |

BENJAMIN A. BORCHELT, Primary Examiner

STEPHEN C. BENTLEY, Assistant Examiner